(12) United States Patent
Kunkel et al.

(10) Patent No.: US 6,291,049 B1
(45) Date of Patent: Sep. 18, 2001

(54) SANDWICH STRUCTURE AND METHOD OF MAKING SAME

(75) Inventors: Edward Kunkel, Newton; Eric Blaney, Maynard; Constance Magee, Wilmington; David Rich, Dedham, all of MA (US)

(73) Assignee: Aztex, Inc., Waltham, MA (US)

( * ) Notice: Subject to any disclaimer, the term of this patent is extended or adjusted under 35 U.S.C. 154(b) by 0 days.

(21) Appl. No.: 09/175,663

(22) Filed: Oct. 20, 1998

(51) Int. Cl.[7] ........................................ B32B 3/06
(52) U.S. Cl. .................. 428/99; 428/119; 428/317.9; 428/319; 442/373
(58) Field of Search .................. 428/99, 116, 119, 428/317.9, 318.4, 319.3; 442/370, 373

(56) References Cited

U.S. PATENT DOCUMENTS

| 2,557,668 | 6/1951 | Lincoln . |
| 3,031,349 | 4/1962 | Dritz . |
| 3,122,465 | 2/1964 | Keller et al. . |
| 3,146,141 | 8/1964 | Woodland . |
| 3,243,332 | 3/1966 | Dritz . |
| 3,328,218 | 6/1967 | Noyes . |
| 3,357,090 | 12/1967 | Tiffany . |
| 3,367,809 | 2/1968 | Soloff . |
| 3,384,283 | 5/1968 | Mims . |
| 3,394,283 | 7/1968 | Mann . |
| 3,401,861 | 9/1968 | Folk . |
| 3,440,117 | 4/1969 | Soloff . |
| 3,460,236 | 8/1969 | Christy et al. . |
| 3,480,492 | 11/1969 | Hauser . |
| 3,538,668 | 11/1970 | Anderson . |
| 3,579,411 | 5/1971 | Mackie et al. . |
| 3,666,599 | 5/1972 | Obeda . |
| 3,719,212 | 3/1973 | Emerson et al. . |
| 3,750,355 | 8/1973 | Blum . |
| 3,837,985 | 9/1974 | Chase . |
| 3,887,985 | 6/1975 | Zenon . |
| 3,900,651 | 8/1975 | Hoppe et al. . |
| 4,027,370 | 6/1977 | Bachar . |
| 4,109,435 | 8/1978 | Loyd . |
| 4,136,226 | 1/1979 | Gilman . |
| 4,171,306 | 10/1979 | Tuba et al. . |
| 4,172,916 | 10/1979 | Watson . |
| 4,247,345 | 1/1981 | Kadija et al. . |
| 4,274,901 | 6/1981 | Elber . |
| 4,299,871 | 11/1981 | Forsch . |
| 4,328,272 | 5/1982 | Maistre . |

(List continued on next page.)

FOREIGN PATENT DOCUMENTS

| 79 301 953.0 | 9/1979 | (EP) . |
| WO95/03170 | 2/1995 | (WO) . |

*Primary Examiner*—Blaine Copenheaver
*Assistant Examiner*—Christopher Paulraj
(74) *Attorney, Agent, or Firm*—Iandiorio & Teska

(57) ABSTRACT

A sandwich structure including a core having opposing top and bottom surfaces, a plurality of discrete pins disposed through the core and extending beyond the top and bottom surfaces of the core, a face sheet on the top core surface, and a face sheet on the bottom core surface. The ends of each pin are bent over and lie between the respective core surfaces and the face sheets to secure the face sheets to the core, improve the strength of the core, and to provide a physical connection between the two face sheets. Also disclosed is a reinforced core for a sandwich structure which does not yet have the face sheets assembled to it. Also disclosed is a method of making such a reinforced core and completed sandwich structures including such a core.

18 Claims, 4 Drawing Sheets

U.S. PATENT DOCUMENTS

| | | |
|---|---|---|
| 4,350,728 | 9/1982 | Huang et al. . |
| 4,361,613 | 11/1982 | Bogner et al. . |
| 4,373,653 | 2/1983 | Salzer et al. . |
| 4,426,414 | 1/1984 | Wilkerson . |
| 4,469,470 | 9/1984 | Geary . |
| 4,489,123 | 12/1984 | Schijve et al. . |
| 4,528,051 | 7/1985 | Heinze et al. . |
| 4,541,349 | 9/1985 | Inoue . |
| 4,556,591 | 12/1985 | Bannink . |
| 4,556,592 | 12/1985 | Bannink . |
| 4,560,603 | 12/1985 | Giacomel . |
| 4,567,076 | 1/1986 | Therrien . |
| 4,582,740 | 4/1986 | Ziircher et al. . |
| 4,637,947 | 1/1987 | Maekawa et al. . |
| 4,679,291 | 7/1987 | Schmeal et al. . |
| 4,761,871 | 8/1988 | O'Connor et al. . |
| 4,786,343 | 11/1988 | Hertzberg . |
| 4,798,639 | 1/1989 | Yamaguchi . |
| 4,808,461 | 2/1989 | Boyce et al. . |
| 4,863,551 | 9/1989 | Ogura . |
| 4,910,067 | 3/1990 | O'Neill . |
| 5,021,280 | 6/1991 | Farnworth et al. . |
| 5,041,321 | 8/1991 | Bendig . |
| 5,102,723 | 4/1992 | Pepin . |
| 5,108,830 | 4/1992 | Osaka et al. . |
| 5,186,776 | 2/1993 | Boyce et al. . |
| 5,345,738 | 9/1994 | Dimakis . |
| 5,376,598 | 12/1994 | Preedy et al. . |
| 5,437,750 | 8/1995 | Rinse et al. . |
| 5,441,682 | 8/1995 | Baker et al. . |
| 5,445,861 | 8/1995 | Newton et al. . |
| 5,466,506 | 11/1995 | Freitas et al. . |
| 5,589,016 | 12/1996 | Hoopingarner et al. . |
| 5,624,622 | 4/1997 | Boyce et al. . |
| 5,736,222 | 4/1998 | Childress . |
| 5,741,574 | 4/1998 | Boyce et al. . |

SANDWICH STRUCTURE AND METHOD OF MAKING SAME

FIELD OF INVENTION

This invention relates to a truss reinforced foam core and to such a foam core which can be incorporated as a part of a sandwich structure, the manufacture of which does not require the use of an autoclave

BACKGROUND OF INVENTION

In U.S. Pat. Nos. 5,624,622 and 5,741,574 incorporated herein by this reference, there are disclosed truss reinforced foam core sandwich structures wherein a plurality of pins are disposed in a foam core and the extending ends of the pins are then driven into composite face sheets on each side of the foam core. See also U.S. Pat. No. 5,736,222 also incorporated herein by this reference.

One potential drawback with these structures is that an autoclave must generally be used to obtain the pressure required to drive the pin ends into the face sheets.

An autoclave adds significantly to the cost of manufacturing such sandwich structures and for large structures the use of an auto-lave may be impractical.

SUMMARY OF INVENTION: I

It is therefore an object of this invention to provide a truss reinforced foam core sandwich structure and method of making such a sandwich structure that does not require the use of an autoclave.

It is a further object of this invention to provide such a sandwich structure and method which is extremely versatile.

It is a further object of this invention to provide such a sandwich structure which is significantly less expensive to manufacture than prior art sandwich structures.

It is a further object of this invention to provide such a sandwich structure and method which prevents delamination of the face sheet; from the core material.

It is a further object of this invention to provide such a sandwich structure and method which results in a sandwich structure having improved shear strength, compressive strength, and fatigue strength.

It is a further object of this invention to provide an improved truss reinforced foam core body which may be used in the manufacture of sandwich structures.

This invention results from the realization that many of the beneficial characteristics of a truss reinforced foam core sandwich structures can be obtained by bending the ends of pins extending from the core over the surfaces of the core and then assembling the face sheets on the core and over the bent over pin ends thus eliminating the expense and impracticability of using an autoclave to drive the pin ends through the face sheets of the sandwich structure.

The pins secure the face sheets to the foam core since the pins extend from one face sheet to the other and their bent over ends become part of the face sheets. In addition, the pins reinforce the foam core and greatly improve the shear, compressive, and fatigue strengths of the sandwich structure.

This invention features a sandwich structure comprising a core having opposing top and bottom surfaces; a plurality of discrete pins disposed through the core and extending beyond the top and bottom surfaces of the core; a face sheet on the top core surface; and a face sheet on the bottom core surface, the ends of each pin bent over and lying between the respective core surfaces and the face sheets.

The core is typically made of foam. Each pin may include strands of fiber and the strands of fiber are separated from each other at the extending bent over ends of each pin. The pins may also be wires.

Each face sheet preferably includes an array of fibers in a resin matrix. The array of fibers may form a fabric. Alternatively, each face sheet is made of metal.

The pins are typically disposed at an angle in the core forming a truss structure therein. Each pin may be angled differently from each adjacent pin. The bent over ends of the pins may form a repeating pattern of sets of pin ends along the top and bottom surface of the core. Each pin in a set of pin ends in the top surface extends to a different set of pin ends in the bottom surface. And, each pin end in a set of pin ends is bent in a different direction.

This invention also features an improved core without any face sheets to be incorporated into a sandwich structure with face sheets. The improved core comprises a core body; a top and bottom surface; and a plurality of discrete pins inserted through the core, the ends of each pin extending from the top and bottom surfaces of the core and bent over and lying along the respective top and bottom surfaces of the core. The core body is typically foam but may be any cellular material. Each pin may include strands of fiber and the strands of fiber are separated from each other and splayed out at the bent over ends of each pin. The pins are preferably disposed at an angle in the core forming a truss structure therein and each pin is angled differently from each adjacent pin. The bent over ends of the pins preferably form a repeating pattern of sets of pin ends along the top and bottom surface of the core and each pin in a set of pin ends in the top surface of the core extends to a different set of pin end in the bottom surface of the core. Also, each pin end in a set of pin ends is bent in a different direction.

In another embodiment, the sandwich structure of this invention includes a core having top and bottom surfaces; a top face sheet material layer on the top core surface; a bottom face sheet material layer on the bottom core surface; and a plurality of pins disposed both through the core and the face sheet material layers and extending beyond the face sheet material layers. The extending ends of each pin are bent over and lie along the exterior of the respective face sheet material layers.

The face sheet material could be a dry fabric (e.g. fiberglass before it is impregnated with resin) or a prepreg material. The pins are usually discrete and do not join with adjacent pins.

This invention also features a method of manufacturing a sandwich structure, the method comprising disposing a plurality of pins through a core such that the ends of the pins extend from the core; bending the extending ends of the pins over to lie on the core; and assembling face sheets on the core and over the bent over pins.

The pins may include strands of fiber coated with a resin and the step of bending includes subjecting the pins to heat and pressure by placing the core/pin combination in a hot press. The step of assembling the face sheets includes laying a prepreg layer on the core over the bent pin ends and curing the prepreg layer. Alternatively, the step of assembling the face sheets includes laying a dry fabric layer on the core over the bent pin ends, impregnating the dry fabric layer with resin, and curing the resin.

Disposing the pins includes inserting the pins at an angle in the core forming a truss structure therein. Inserting the pins may include orienting each pin at an angle different than the angle of each adjacent pin. Disposing the pins also typically includes forming a repeating pattern of pin end sets, each pin, in each set of pin ends on one surface of the core extending to a different set of pin ends on the other surface of the core. The pin ends of each set of pin ends are bent in a different direction. This invention also features the product made by this method.

The method of manufacturing an improved core for a sandwich structure in accordance with this invention includes inserting a plurality of pins through a core such that the ends of the pins extend from the top and bottom surfaces of the core; and bending the extending pin ends over to lie along top and bottom surfaces of the core.

The step of inserting the pins includes disposing the pins at an angle in the core forming a truss structure therein. The angle of each pin is preferably different from the angle from each adjacent pin. The method may include forming a repeating pattern of sets of pin ends, each pin end in each set of pin ends on one surface of the core extending to a different set of pin ends on the other surface of the core. The pin ends of each set of pin ends are preferably bent in a different direction. This invention also features the product made by this method.

In another embodiment, a plurality of pins are inserted through a core such that the ends of the pins extend from the core; face sheet material is assembled on the core such that the extending pin ends pierce through the face, sheet material; and the extending pin ends are bent over the face sheet material. The face sheet material may be a prepreg or dry fabric which has yet to be impregnated with a resin. The step of inserting the pins typically includes disposing the pins at an angle in the core forming a truss structure therein wherein the angle of each pin is different from the angle of each adjacent pin. In addition, or alternative, the step of inserting the pins includes forming a repeating pattern of sets of pin ends, each pin end in each set of pin ends on one surface of the core extending to a different set of pin ends on the other surface of the core. Preferably, the pin ends of each set of pin ends are bent in different directions. This invention also includes the product resulting from this method.

DISCLOSURE OF PREFERRED EMBODIMENT

Other objects, features and advantages will occur to those skilled in the art from the following description of a preferred embodiment and the accompanying drawings, in which.

Figure 1:
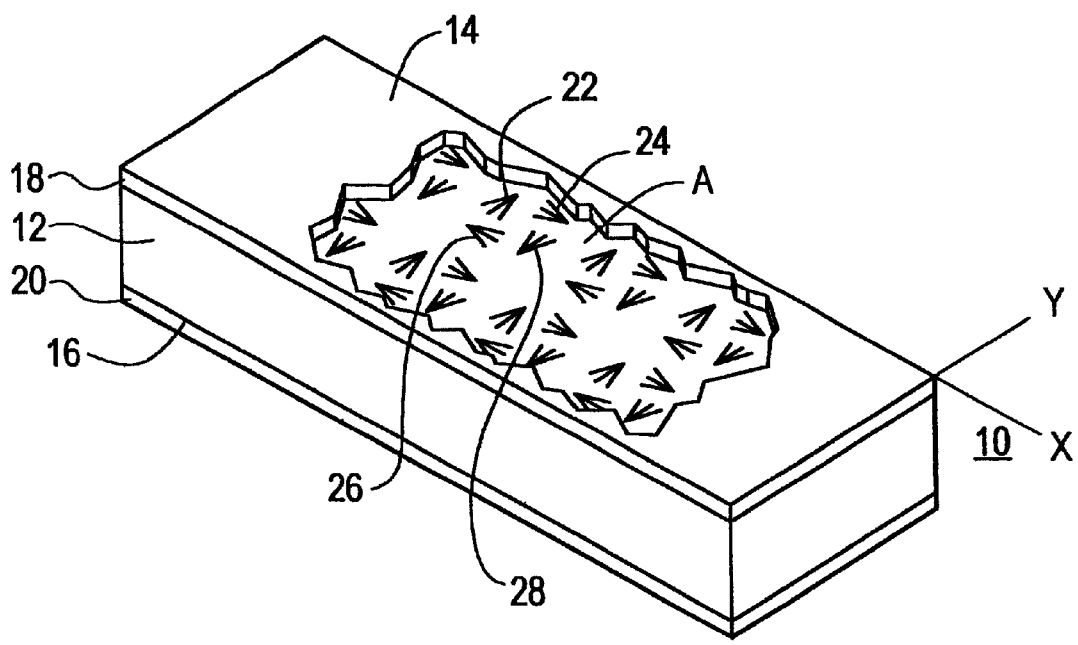
FIG. 1 is a schematic top view of the sandwich structure of the subject invention.

Sandwich structure 10 may be used in the manufacture of boat hulls, skis, riser plates for skis, snow boards, and a variety of structure is used in military and aerospace applications. In general, sandwich structure 10 can be used anywhere honeycomb sandwich structures, or other sandwich structures including wood, foam or other cores are currently used.

Sandwich structure 10, preferably includes foam core 12 having opposing top 14 and bottom 16 surfaces. Core 12 could be made out of any compressible material such as cork. In many applications, thermoformable foam is preferred in order to manufacture complex sandwich structure shapes. In addition, foam cores with layers of varying density can be used. Examples of the various types of foam materials which may be used such as core 12 are delineated in U.S. Pat. No. 5,624,622. As used herein, the term "foam" is to be given its broadest interpretation meaning any cellular material having characteristics which allow penetration of pins and provides sufficient lateral support to the pins to prevent them from buckling.

On top 14 and bottom 16 surfaces of foam core 12 are face sheets 18 and 20. Face sheets 18 and 20 may be composite structures including an array of fibers in a resin matrix. Face sheets 18 and 20 may be a prepreg material which is cured during fabrication or a layer of fabric which must be resin impregnated and then cured. Alternatively, sheets 18 or 20 may be metal, a metal alloy, or some other unitary material depending on the specific implementation.

A plurality of discrete pins 22, 24, 26, and 28 extend from the top 14 to the bottom 16 surface of core 12 with each end of each pin extending from the surface of the core and bent over and lying between the core and the face sheets as shown. The other end of each pin is similarly bent over along the button surface of the core. Thus, the pin pattern shown in FIG. 1 is repeated on the bottom side of structure 10.

In FIG. 1, each pin is made of fiber bundles (e.g. S-glass) which include strands of fibers surrounded by a cured resin. When the ends of these pins are bent over under sufficient heat and pressure, the individual fibers are exposed and splay out as shown on the surfaces of the core.

In the preferred embodiment, the face sheets in the form of a prepreg material are then laid on core surfaces 14 and 16 over the exposed, splayed out, bent over ends of the pins. After this structure including the prepreg layers is then bagged and vacuum cured, the pins tie the face sheets to core layer 12 since the pins extend from one face sheet to another and become part of each face sheet. Resin from the prepreg layers attaches itself to the exposed individual fibers of each pin and may even seep down along the length of each pin. The use of fibrous pins, however, is not a limitation of the subject invention and pins made out of wire or other materials may be used. Examples of other fibrous pins includes pins made of Kevlar or E-glass.

The pins reinforce foam core 12 by forming a truss structure therein which greatly increases the shear, compressive, and fatigue strength of the sandwich structure. In one test, a sandwich structure without any pins in the foam core suffered fatigue failure after only 10,000 bending cycles. Sandwich structure 10, FIG. 1, however, greatly exceeded a 150,000 bending cycles before failure.

Significantly, no autoclave is required in the manufacture of sandwich structure 10. As explained in the Background of the Invention above, in some cases the use of an autoclave is impractical and in other cases it adds significantly to the cost of the final product.

Indeed, in one prototype, sandwich structure 10 was manufactured by laying fabric layers on each surface of foam core 12, manually impregnating these fabric layers with a resin, and allowing the resin to cure under low pressure and at room temperature. The resulting structure was used as riser plates for a pair of skis and performed extremely well. In some cases, however, and where feasible, an autoclave could still be used in order to impregnate and/or cure face sheets 18 and 20.

Figure 2:
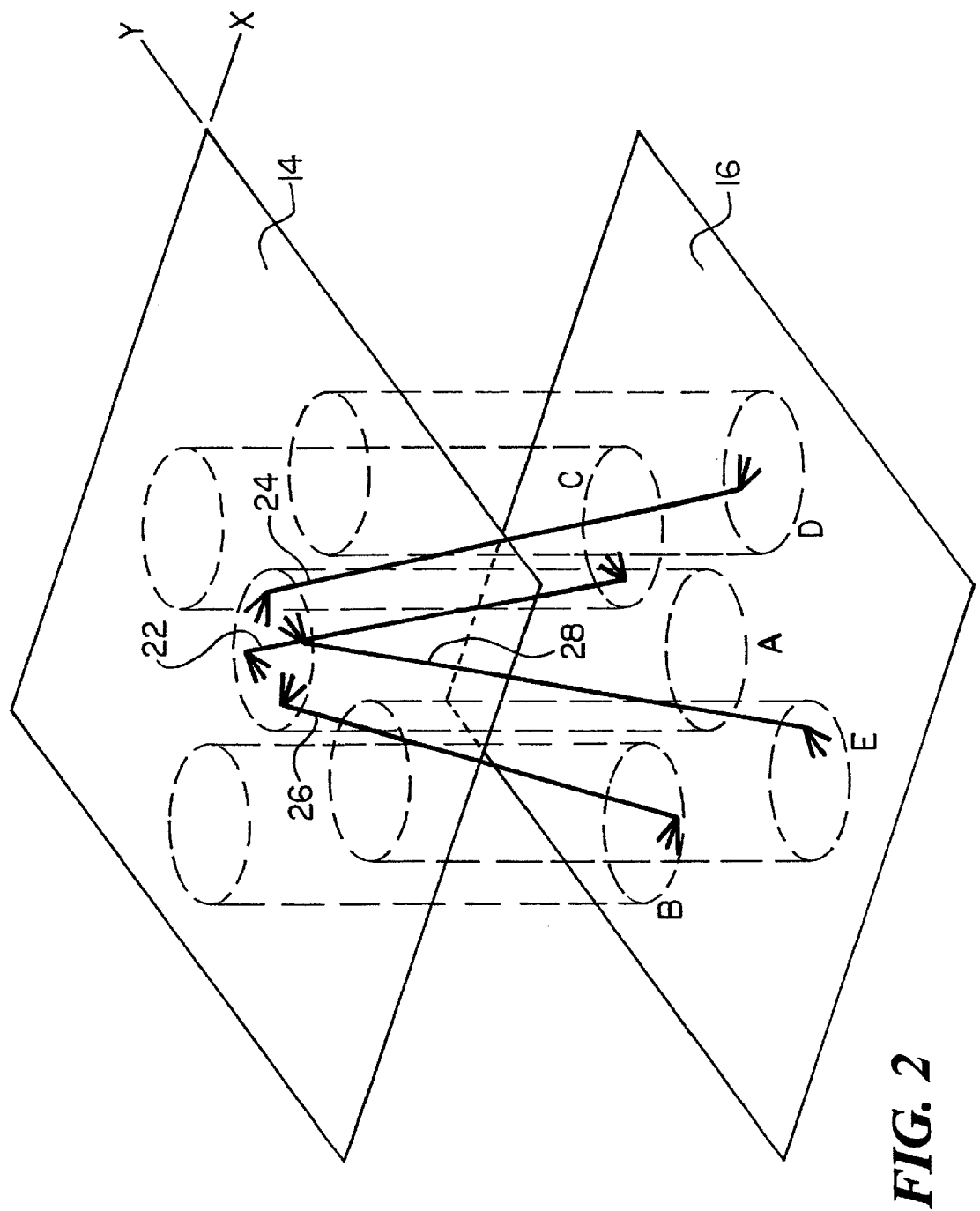
FIG. 2 is a schematic elevational view showing the orientation of the pins in the foam core of the sandwich structure of the subject invention.
Figure 3:
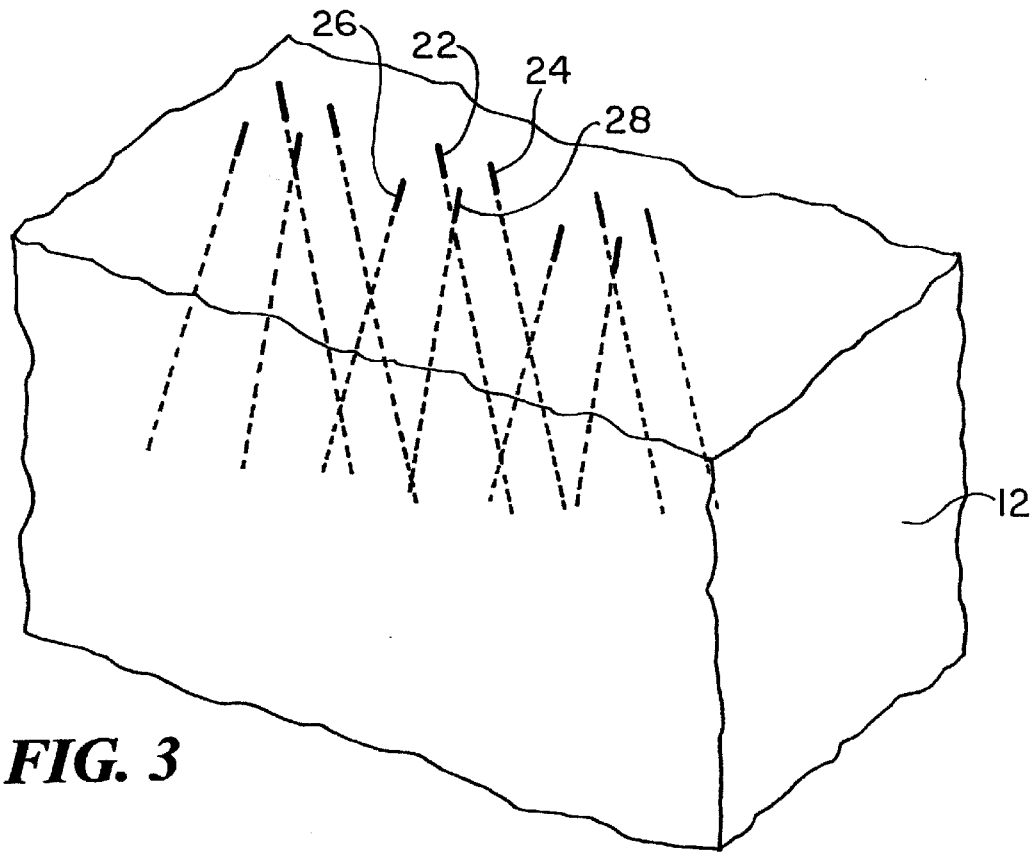
FIG. 3 is a simplified three dimensional schematic view showing the pins in the foam core in accordance with the subject invention before their ends are bent over.
Figure 4:
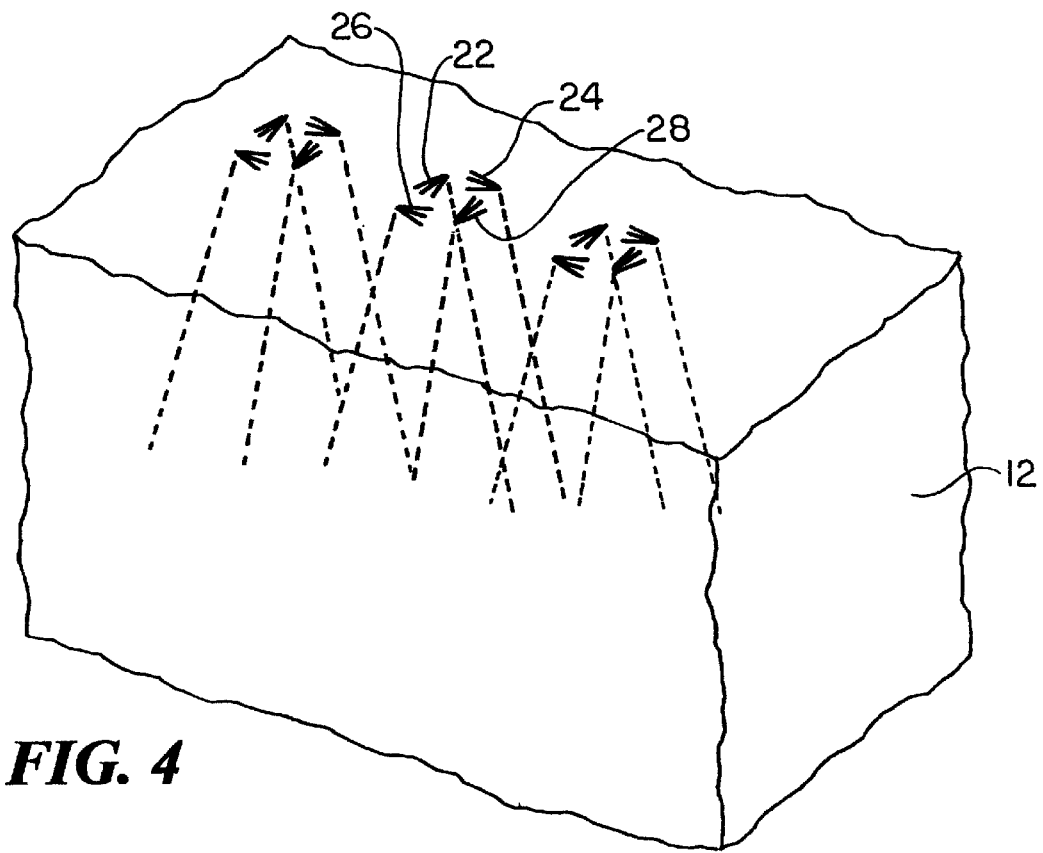
FIG. 4 is view similar to FIG. 3 after the pin ends have been bent have over along the top and bottom surfaces of the foam core.

In order to form an optimal truss structure within foam core 12, the pins are preferably disposed at an angle of about 30° to normal as shown in FIGS. 2–4. In the structure shown there is a repeating pattern of four pins 22, 24, 26, and 28 in a set, pin 22 bent in the direction of the negative Y axis, pin 26 bent in the direction of the positive X axis, pin 24 bent in the direction of the negative X axis, and pin 28 bent in the direction of the positive Y axis. This is accomplished by disposing the pins at an angle in the foam core such that pin 22 extends rearward and down, pin 28 extends forward and down, pin 24 extends down and to the right, and pin 26 extends down and to the left. Thus, each pin in the set of four pins at the top surface 14 of foam core 12 forms a part of a different set of four pins in the bottom surface 16 of foam core 12.

In this way, pins 22, 24, 26, and 28 of pin end set A at top surface 14 of foam core 12 all extend to a different set of pin end sets in the repeating pattern of sets of four pin ends on the bottom surface 16 of core 12. Thus, pin end set A is made up of pins having their other ends forming portions of pin sets B, C, D, and E on the bottom surface 16 of foam core 12. See FIG. 2.

This structure also allows for each pin end to bent one way on top surface 14 of foam core 12 and to be bent the opposite way on the bottom surface 16 of foam 12 which adds to the strength of the structure. The fact that each pin end in each set of four pin ends is also bent in a different direction also increases the strength of the structure. Also, since the pins are oriented at an angle, they are predisposed to bend in the proper direction under the application of vertical pressure in a heat press.

In one embodiment of the subject invention, the core with the pins extending therethrough and bent over along the top and bottom core surfaces is provided to the customer without face sheets. That way, the customer can install the face sheets in the manner that the customer is accustomed to. The dimensions of the core and the material requirements thereof can then be specified by the customer.

In the example shown in FIG. 1, there were four sets of pin ends in a square inch of top surface 14 of core 12, each set including four pin ends. Each pin end in each set is separated from each adjacent pin end by about 5/16" with the splayed out portion of each pin end about 3/16" from each adjacent pin end in a set. Each set of pin ends was also approximately 3/16" from the each adjacent set. The pin ends are about 1/8" long and the pin body is about a 1/2" long for a foam core of about 1/2" thick and face sheet less than 1/8" thick. The pin diameter was 28 mils. These dimensions will change, inter alia, depending on the thickness and material of the foam core, the thickness and material of the face sheets, and the diameter and material of the pins.

Figure 5:
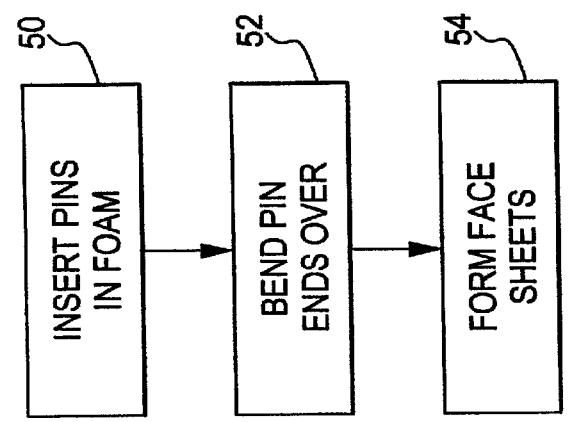
FIG. 5 is a flow chart showing the primary steps associated with manufacturing the sandwich structure of the subject invention.

In a preferred embodiment, manufacturing of a sandwich structure in accordance with this invention includes inserting the pins in the foam body, step 50, FIG. 5, such that the ends of the pins extend from the top and the bottom surfaces of the core as shown in FIG. 3.

The pins may be inserted by hand, by numerical control machines, by stitching or needling, or by other known methods. The pin reinforced foam core may be purchased from Aztex, Inc., Waltham, Mass. The density, diameter, and angle of the pins and the pin material will depend on the specific design criteria as well as the selection of the foam material. See U.S. Pat. No. 5,736,222. To form the pin end pattern shown in FIGS. 1–4, the following procedure is used.

After inserting the pins, the pin ends are bent over to lie along the top and bottom surfaces of the core, step 52, FIG. 5 as shown in FIG. 4. When the pins are made of S-glass, a hot press machine is employed for this purpose. In one example, the temperature of the plates was raised to between 150–300° F. of and a pressure of 10 psi applied for a few seconds. At this temperature, the resin coating around the individual fibers melts allowing the individual fibers to bend over and spread out as shown in FIGS. 1 and 4. The pins are bent under sufficient pressure without breaking them. The actual temperature, pressure, and time period, however, will vary depending on the specific pin material and sandwich structure configuration.

The face sheets are then added to this structure, step 54, FIG. 5. In general, the steps taken to form a sandwich structure with any foam, wood, honeycomb, or other core is now followed to manufacture the final product in accordance with the subject invention. In general, however, an autoclave is not required. In one embodiment, prepreg material was laid upon the top and bottom surfaces of the foam body and over the bent over pins and then this structure was bagged and vacuum cured in the way typically associated with curing prepreg material.

Figure 7:
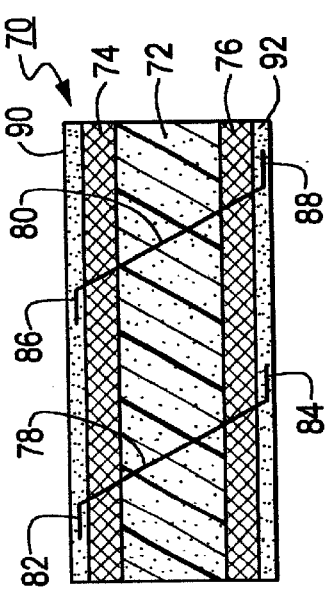
FIG. 7 is a side cross-sectional view of another embodiment of the sandwich structure of the subject invention.
Figure 6:
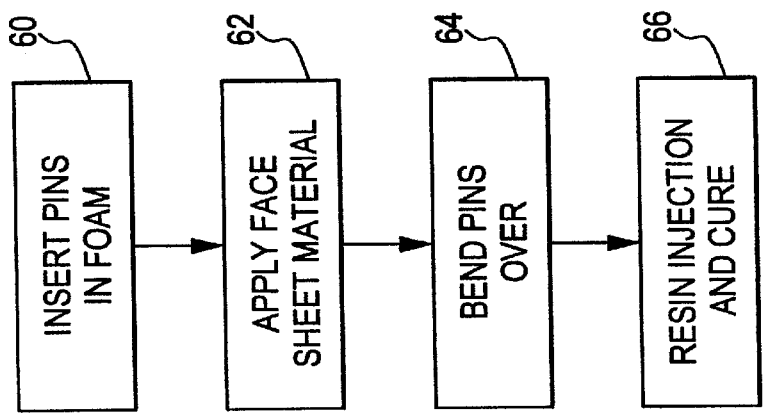
FIG. 6 is a flow chart depicting the primary steps associated with manufacturing another embodiment of the sandwich structure of the subject invention.

In another embodiment, step 60, FIG. 6, the pins are inserted into the foam body as in step 50, FIG. 5, but then a layer of dry fiberglass material is placed on the top and bottom surfaces of the foam core, step 62, FIG. 6. The weave of this dry fiberglass material allows the extending ends of the pins to easily pierce the dry fiberglass material. Next, the pins are bent over the dry fiberglass material, step 64, FIG. 6. Resin is then brushed on or injected into the dry fiberglass material and again this structure is bagged and vacuum cured, step 66, FIG. 6. The resulting structure is shown in FIG. 7 where sandwich structure 70 includes foam core 72, opposing composite fiberglass face sheets 74 and 76, pins 78 and 80 extending through foam core 72 and face sheets 74 and 76 terminating in bent over ends 82, 84, 86, and 88 and encapsulated in resin layers 90 and 92 which are enlarged in FIG. 7 for clarity. Actually, the bent over pin ends, for all practical purposes, become a part of the cured face sheets.

Figure 8:
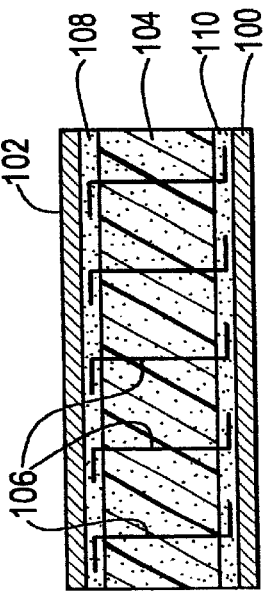
FIG. 8 is side cross-sectional view of still another embodiment of the sandwich structure of the subject invention.

In another embodiment, metal face sheets 100 and 102, FIG. 8 are used and core 104 is cork. After the pins 106 (here wire) are disposed vertically through cork core 105 and bent over as shown, epoxy layers 108 and 110 are applied and then the metal face sheets 100 and 102 are secured to the core over the pins under pressure.

Alternatively, core 104 could be foam, epoxy layers 108 and 110 could be composite material (e.g. prepreg) and an additional epoxy layer used to secure the metal face sheets 100 and 102 to the composite layers.

Although specific features of this invention are shown in some drawings and not others, this is for convenience only as each feature may be combined with any or all of the other features in accordance with the invention.

Other embodiments will occur to those skilled in the art and are within the following claims:

What is claimed is:
1. A sandwich structure comprising:
   a core having opposing top and bottom surfaces;
   a plurality of discrete pins disposed through the core and extending beyond the top and bottom surfaces of the core;

a face sheet on the top core surface; and a face sheet on the bottom core surface, the ends of each pin bent over and lying between the respective core surfaces and the face sheets.

2. The sandwich structure of claim 1 in which the core is made of foam.

3. The sandwich structure of claim 1 in which each pin includes strands of fiber.

4. The sandwich structure of claim 3 in which the strands of fiber are separated from each other at the extending bent over ends of each pin.

5. The sandwich structure of claim 1 in which the pins are wires.

6. The sandwich structure of claim 1 in which each face sheet includes an array of fibers in a resin matrix.

7. The sandwich structure of claim 6 in which the array of fibers form a fabric.

8. The sandwich structure of claim 1 in which each face sheet is made of metal.

9. The sandwich structure of claim 1 in which the pins are disposed at an angle in the core forming a truss structure therein.

10. The sandwich structure of claim 9 in which each pin is angled differently from each adjacent pin.

11. The sandwich structure of claim 1 in which the bent over ends of the pins form a repeating pattern of sets of pin ends along the top and bottom surface of the core.

12. The sandwich structure of claim 11 in which each pin in a set of pin ends in the top surface extends to a different set of pin ends in the bottom surface.

13. The sandwich structure of claim 11 in which each pin end in a set of pin ends is bent in a different direction.

14. A sandwich structure comprising:

a core having opposing top and bottom surfaces;

a plurality of discrete pins disposed through the core and extending beyond the top and bottom surfaces of the core wherein each pin includes strands of fiber;

a face sheet on the top core surface; and a face sheet on the bottom core surface, the ends of each pin bent over and lying between the respective core surfaces and the face sheets wherein the strands of fibers are separated from each other at the extending bents over ends of each pin.

15. An improved core for a sandwich structure, the improved core comprising:

a core body;

a top and bottom surface; and a plurality of discrete pins each having strands of fiber inserted through the core, the ends of each pin extending from top and bottom surfaces of the core and bent over and lying along the respective top and bottom surfaces of the core wherein the strands of fiber are separated from each other at the bent over ends of each pin.

16. A sandwich structure comprising:

a core having top and bottom surfaces;

a top face sheet material layer on the top core surface;

a bottom face sheet material layer on the bottom core surface; and a plurality of discrete pins each having strands of fiber disposed through the core and the face sheet material layers and extending beyond the face sheet material layers, the extending ends of each pin bent over and lying along the exterior of the respective face sheet material layers wherein the strands of fiber are separated from each other at bent over ends of each pin.

17. An improved core for a sandwich structure, the improved core comprising:

a core body;

a top and bottom surface; and a plurality of discreet pins inserted through the core, the ends of each pin extending from the top and bottom surfaces of the core and bent over and lying along the respective top and bottom surfaces of the core, each pin including strands of fiber and wherein the strands of fiber are separated from each other at the bent over ends of the pin.

18. A sandwich structure comprising:

a core having top and bottom surfaces;

a top face sheet material layer on the top core surface;

a bottom face sheet material layer on the bottom core surface; and a plurality of pins disposed through the core and the face sheet material layers and extending beyond the face sheet material layers, the extending ends of each pin bent over and lying along the exterior of the respective face sheet material layers, each pin including strands of fiber, the strands of fiber separated from each other at the bent over ends of each pin.

* * * * *